United States Patent [19]

Hicks

[11] Patent Number: 4,941,051
[45] Date of Patent: Jul. 10, 1990

[54] SIGNAL PROCESSING CIRCUIT AND METHOD

[75] Inventor: Michael E. Hicks, Hertfordshire, England

[73] Assignee: Crossfield Electronics Limited, London, England

[21] Appl. No.: 302,873

[22] Filed: Jan. 30, 1989

[30] Foreign Application Priority Data

Feb. 3, 1988 [GB] United Kingdom ................. 8802381

[51] Int. Cl.$^5$ .............................................. H04N 3/14
[52] U.S. Cl. ................................. 358/213.16; 358/172
[58] Field of Search .................... 358/171, 172, 213.16, 358/213.15, 213.17, 213.18

[56] References Cited

U.S. PATENT DOCUMENTS

| | | | |
|---|---|---|---|
| 4,525,743 | 6/1985 | Wood, Jr. et al. | 358/213.16 |
| 4,584,607 | 4/1986 | Miyazawa | 358/209 |
| 4,589,025 | 5/1986 | Monahan et al. | 358/213.16 |
| 4,630,121 | 12/1986 | Suzuki et al. | 358/213.16 |
| 4,679,087 | 7/1987 | Torrano, Jr. et al. | 358/172 |
| 4,723,169 | 2/1988 | Kaji et al. | 358/172 |
| 4,742,394 | 5/1988 | Dielhof | 358/213.16 |
| 4,763,197 | 8/1988 | Masuda | 358/213.16 |

OTHER PUBLICATIONS

Patent Abstracts of Japan, vol. 7, No. 76 (E-167) [1221] & JP-A-58 5083.
Patent Abstract of Japan, vol. 5, No. 3, (E-40) [675] & JP-A-55 135 463.
"High Speed and High Resoulution ISO A4 Size Amorphous Si:H Contact Linear Image Sensor", M. Sakamoto et al., 34th Electronic Components Conference, 1984.

*Primary Examiner*—Stephen Brinich
*Attorney, Agent, or Firm*—Sughrue, Mion, Zinn, Macpeak & Seas

[57] ABSTRACT

A signal processing circuit for processing in real time output signals from a radiation sensing assembly which generates for successive sampling periods output signals representing respectively a reference level and a radiation level related to the radiation incident on a sensor of the assembly during each sampling period. The circuit comprises a low pass filter for receiving the output signals and for filtering a plurality of reference level signals and a corresponding plurality of radiation level signals associated with the plurality of reference level signals to minimize high frequency noise effects on the signals and to generate filtered and averaged reference level and radiation level signals; and a difference circuit for generating a signal related to the difference between the filtered reference level and filtered radiation level signals.

11 Claims, 3 Drawing Sheets

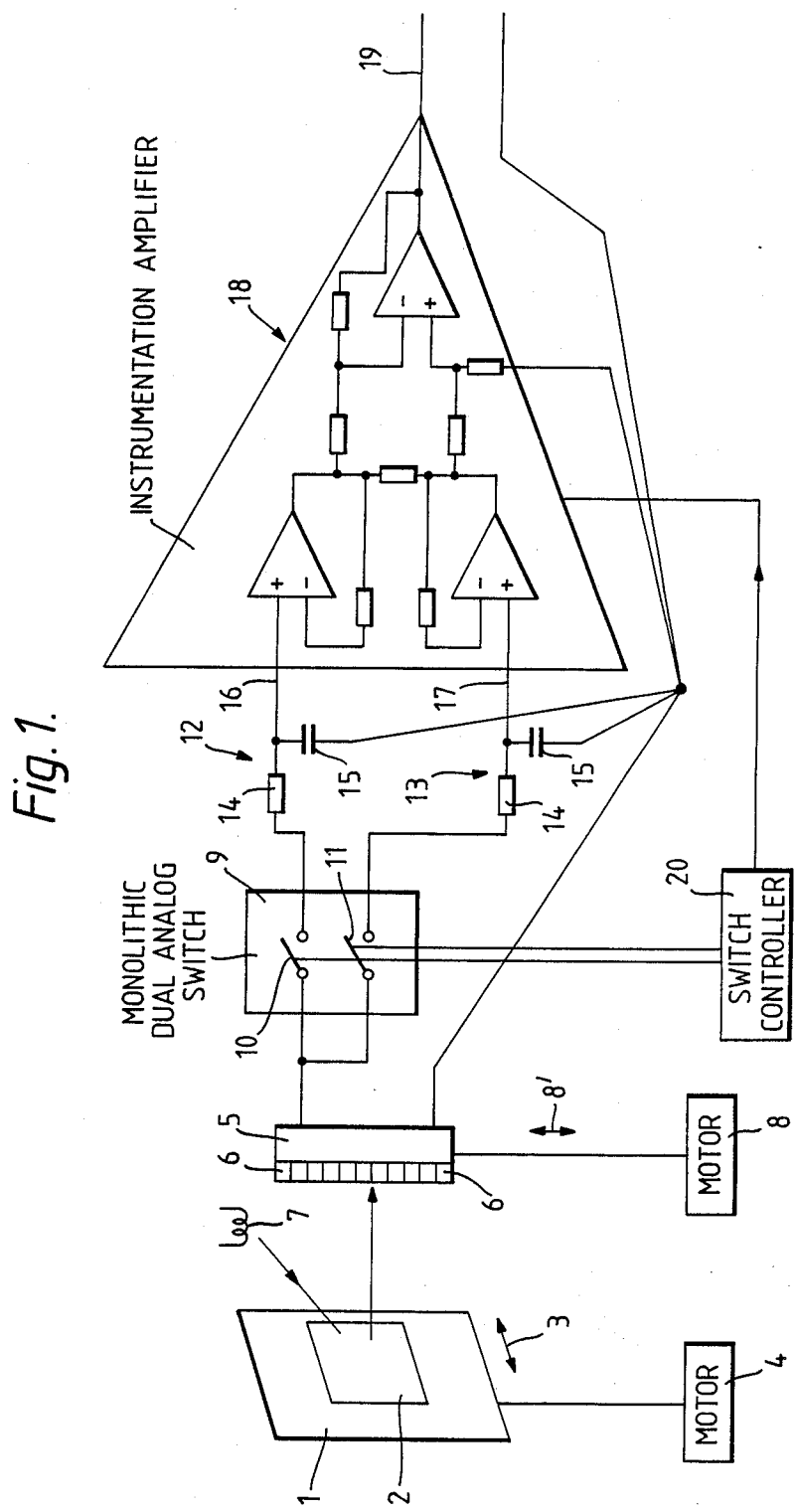

FIG. 2A
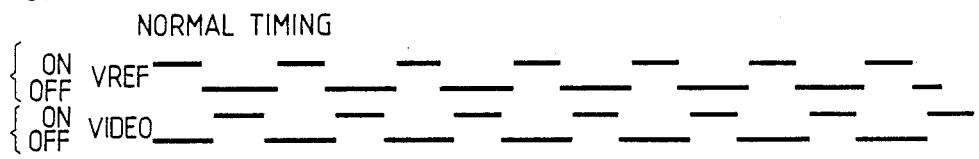
FIG. 2B
FIG. 2C
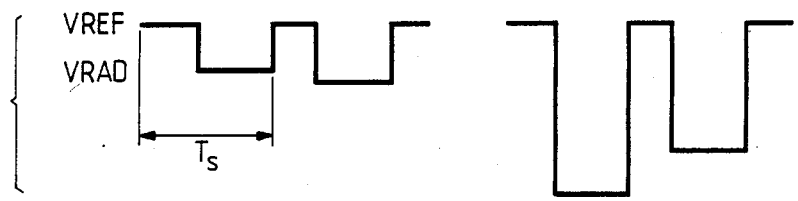
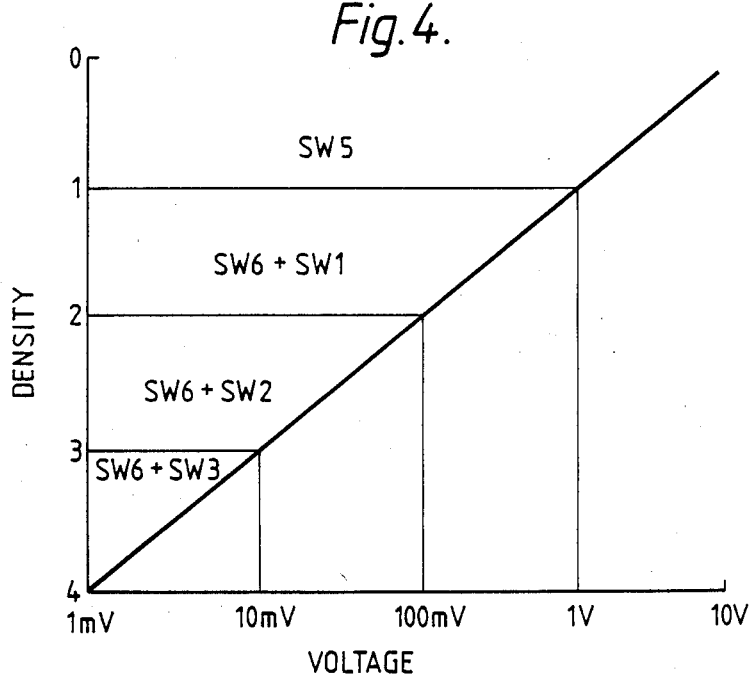
Fig. 4.

SIGNAL PROCESSING CIRCUIT AND METHOD

FIELD OF THE INVENTION

The invention relates to methods and circuits for processing output signals from a radiation sensing assembly.

DESCRIPTION OF THE PRIOR ART

A common form of radiation sensing assembly is a charged coupled device (CCD) which has at least one radiation sensor which builds up and stores a charge relating to the total incident radiation. In operation, this stored charge is regularly sampled, the assembly generating output signals after each sample relating to the stored charge (radiation level) and to a reference level corresponding to no radiation being incident on the CCD for each radiation sensor in series. These devices are commonly used for scanning images and the like to generate digital representations of those images in which relative scanning movement is caused between the CCD (in the form of an array) and the image. One of the problems with these systems is that the performance of the CCD varies depending upon the degree of irradiation. Thus, when high intensity radiation is incident on the array, there is a relatively large difference between the reference level and the radiation level of the output signals. However, when the incident intensity is low as will result from relatively dark areas of an image, the two levels are close together and since there will inevitably be a certain degree of noise in both signals, when an attempt is made to determine the difference between the signals, this has been found to be inaccurate due to the noise problem. In other words, the variation in signal level due to noise is of the same order of magnitude as the difference between the signal levels which is to be determined.

JP-A-585083 describes a system in which a reference value is stored and then subtracted from a filtered radiation level to generate a video output signal free of variation in black level. This system requires a storage device to store the reference level.

US-A-4584607 describes how signals from sensors are fed in parallel to a pair of integrators. However, this requires the use of high speed switching devices and integrators which are reset after each pixel.

SUMMARY OF THE INVENTION

In accordance with one aspect of the present invention, a method of processing output signals from a radiation sensing assembly generates, for successive sampling periods, output signals representing respectively a reference level and a radiation level related to the radiation incident on a sensor of the assembly during each sampling period. In real time, a plurality of successive reference level signals and the corresponding plurality of successive radiation signals associated with the plurality of reference level signals are filtering to minimise high frequency noise effects on the signals, so as to generate filtered and averaged reference level and radiation level signals. A signal is generated, related to the difference between the filtered refefence level and filtered radiation level signals.

In accordance with the second aspect of the present invention, a signal processing circuit processes, in real time, output signals from a radiation sensing assembly which generates for successive sampling periods output signals representing respectively a reference level and a radiation level related to the radiation incident on a sensor of the assembly during each sampling period. A low pass filter receives the output signals and filters a plurality of reference level signals and a corresponding plurality of radiation level signals associated with the plurality of reference level signals to minimise high frequency noise effects on the signals and to generate filtered and averaged reference level and radiation level signals. A difference circuit generates a signal related to the difference between the filtered reference level and filtered radiation level signals.

We have realised that it is possible to simplify the processing circuitry in situations where the incident radiation on the radiation sensing assembly changes at a relatively low frequency compared with the sampling rate when the output signals from the sensors are processed in parallel, and with serial output radiation sensing assemblies used in situations where there is very little difference in the degree of irradiation of adjacent radiation sensors within the same sampling period. We have found that this commonly occurs when scanning high density input material such as parts of photographic positives where there is very little high frequency information and where frequency reduction is approximately proportional to density.

Instead of requiring a storage device, processing can be carried out in real time using relatively slow speed filters effectively storing information from the most recent pixels within the time constant period of the filter. Preferably, signals corresponding to at least two sampling periods are averaged by the filter.

In typical image scanning applications, the information needed is generally not the absolute value of the radiation intensity but the density of the colour component of the pixel being scanned. There is a logarithmic ralationship between the two and thus although the accuracy required in percentage terms is the same for both high and low densities, the accuracy required in absolute terms is much greater at low densities. This can be shown by splitting an amplitude range of 10000 to one which is a density range of four into 1024 steps of equal density, each step being approximately 0.9% different from the next. Due to the logarithmic relationship between density and intensity, there will also be a logarithmic relationship between density and the output signal representing radiation level so that at high densities there will only be very small differences between the output signal levels which will also be close to the zero intensity or reference level while at low densities the intensity will be much higher and changes in intensity at these high levels will result in relatively large differences in the output signal levels.

The method of the invention effectively averages the reference and radiation level signals for a series of pixels (corresponding to individual sampling periods) on the assumption, as already explained, that the radiation levels will be substantially the same or vary at low frequency. Thus, any high frequency variations will be due to noise effects. For typical images on film, the frequency response is reduced in the black or high density areas, and so it is not necessary to take a sample for every pixel in the dark areas, and thus the noise can be averaged out before the signal passes to the high speed components, allowing integrating to take place over a much longer time period to get a noise-free image.

The invention is particularly advantageous in allowing the use of relatively cheap and low noise components which work at a low speed relative to the sampling rate in the case of parallel processing or clock in the case of serial processing. This should be contrasted with conventional signal processing circuits associated with radiatioin sensing assemblies which comprise expensive and complex high speed sample and hold amplifiers to enable the difference between individual pairs of reference and radiation level signals within each sampling or clock period to be determined.

As already mentioned, the reference level signal will typically represent the result of no incident radiation on the radiation sensor.

Typically, the reference level and radiation level ouput signals will be interleaved. In this case, the signal processing circuit further includes timing circuitry for generating timing signals, and a switch to which the interleaved output signals are fed. The low pass filter includes a pair of filters coupled in parallel to the switch whereby the timing circuitry controls the switch to pass the reference level and radiation level signals to respective ones of the pair of filters.

With this arrangement, the two filters act in parallel on the reference level and radiation level signals respectively.

The difference circuit may comprise a conventional instrumentation amplifier.

In accordance with a third aspect of the present invention, in a method of scanning an image, the image is irradiated, causing radiation from the image to impinge on a radiation sensing assembly which generates for seccessive sampling periods output signals representing respectively a reference level and a radiation level related to the radiation incident on each sensor of the assembly during each sampling period, causing relative scanning movement between the image and the sensing assembly, monitoring the general level of radiation impinging on the radiation sensing assembly and
  (i) if the general level is less than a predetermined threshold, carrying out a method according to the first aspect of the invention, and otherwise
  (ii) determining the difference between the reference and radiation levels corresponding to each sensor of the assembly.

This method of operation results in information from the radiation sensing assembly being processed in one of two alternative ways depending upon the general intensity level of the incident radiation. Thus, for relatively high density (black) ragions of the image, the output signals will be processed in accordance with the first aspect of the invention whereas for low density areas the signals will be processed in a conventional manner using typical high speed components.

In accordance with a fourth aspect of the present invention, in image scanning apparatus there are provided a source of radiation and a radiation sensing assembly having a number of radiation sensors and which generates for successive sampling periods output signals representing respectively a reference level and a radiation level related to the radiation incident on each sensor of the assembly during each sampling period, the radiation having impinged on the image. Structure is provided for causing relative scanning movement between an image and the sensing assembly, and for monitoring the general level of radiation impinging on the radiation sensing assembly. There also are provided a signal processing circuit according to the second aspect of the invention; an auxiliary signal processing circuit; and a switch device, responsive to the monitoring such that if the general level of radiation impinging on the radiation sensing assembly is less than the threshold, the switch device causes output signals from the radiation sensing assembly to be processed by the signal processing circuit according to the second aspect of the invention and otherwise causes the output signals to be processed by the auxiliary signal processing circuit which determines the difference between reference and radiation levels corresponding to each sensor.

Typically, the radiation will comprise light.

In general, the radiation sensing assembly will comprise a plurality of radiation sensors arranged in a line, for example a linear CCD array.

BRIEF DESCRIPTION OF THE DRAWING

Some examples of image scanning apparatus incorporating signal processing circuits and methods for operating those circuits in accordance with the present invention will now be described with reference to the accompanying drawings, in which:

FIG. 1 is a schematic block diagram of one example of the apparatus;

FIGS. 2A-2C are diagrams of signals generated in the FIG. 1 example;

FIG. 4 illustrates graphically operation of the switches in FIG. 3.

DETAILED DESCRIPTION OF THE EMBODIMENTS

Figure 3:
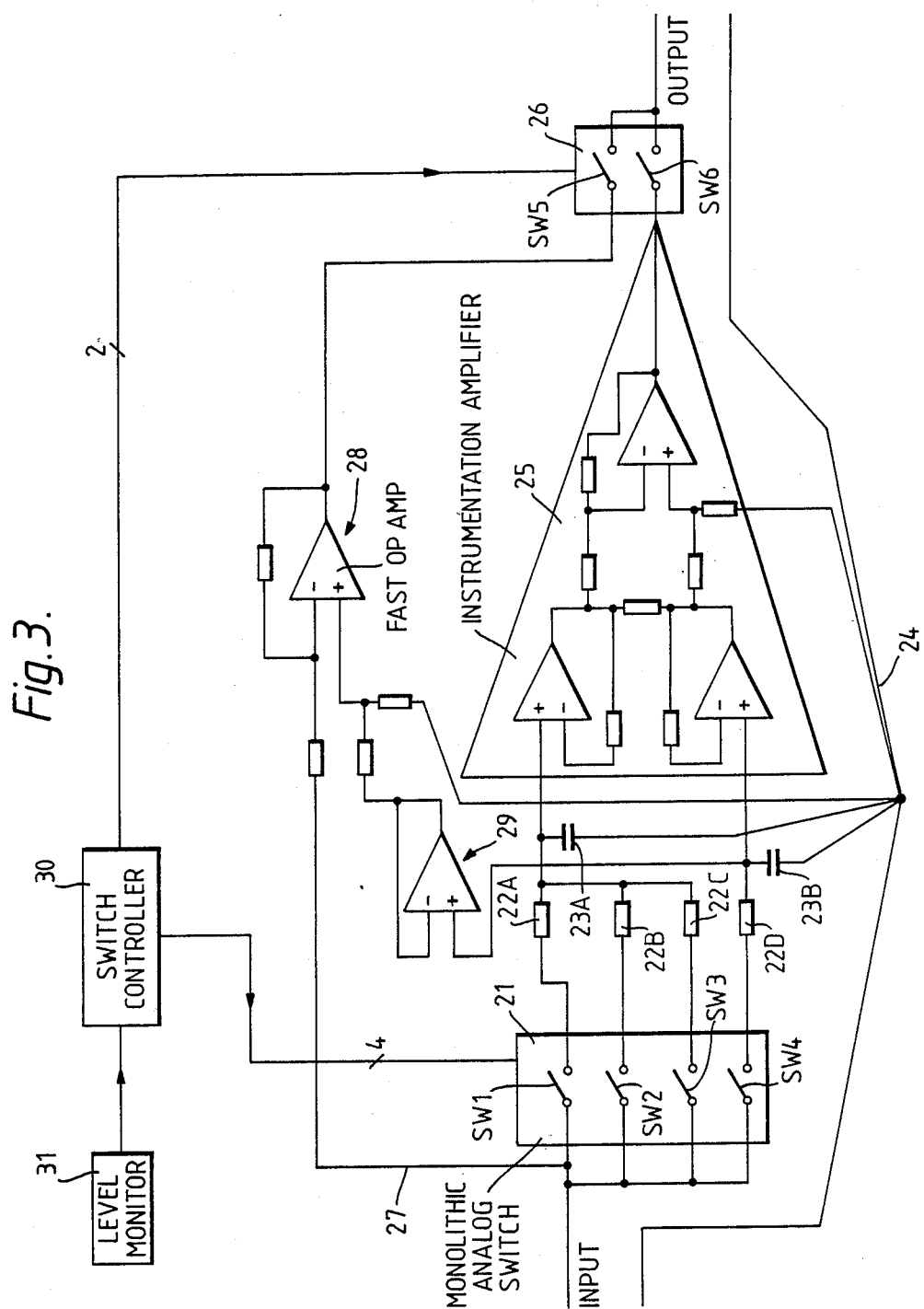
FIG. 3 is a partial block diagram of a second example of the apparatus.

The apparatus comprises a flat bed support 1 on which is mounted an image 2 such as a photographic positive. The flat bed support 1 is movable in a direction 3 under the control of a motor 4 and a rack and pinion transmission (not shown). A linear CCD array 5 is positioned above the image 2 and has a large number of radiation sensors 6 mounted along it. For clarity, only a small number of sensors 6 are shown in the drawing but in practice up to 3500 such sensors may be provided. The image 2 is illuminated from a light source 7 with light reflected from the image impinging on the CCD array 5. In an alternative arrangement, the light source 7 could be arranged to transmit light through the image 2. The CCD array 5 is moved in a direction 8' by a motor 8. This arrangement constitutes a conventional flat bed scanning arrangement and will not be described in further detail.

The CCD array 5 is coupled to front end circuitry so that the output singals from the sensors 6 are fed in series to the circuit shown in FIG. 1. The array 5 is couped to a monolithic dual analogue switch 9 having a pair of switches 10, 11 connected in parallel. An example of a suitable analogue switch is the HI-201 HS. The two oupputs from the switch 9 are fed to respective low pass filters 12, 13, each comprising a resistor 14 and capacitor 15. In a typical example, the resistor 14 with have a resistance of 300 ohms and the capacitor a capacitance of 1000 pF. Output signals from the filters 12, 13 are fed to respective input ports 16, 17 of an instrumentation amplifier 18 which generates an output signal at its output port 19 related to the difference in magnitude between the two input signals at the ports 16, 17. An example of a suitable instrumentation amplifier is the Datel AM-551.

The activation of the individual switches 10, 11 is controlled by a switch controller 20.

In operation, as each sensor 6 of the array 5 receives radiation, it stores an electronic charge which increases with the total incident radiation. This charge is regularly sampled in successive sampling periods and an output signal is genrerated ($V_{rad}$) which varies with the stored charged. The duration of this output voltage is chosen to be about half the length of the sampling period so that for the remaining half of the sampling period a voltage ($V_{ref}$) can be gererated related to the charge stored in the sensor when the sensor is not illuminated. Consequently, by determining the difference between $V_{ref}$ and $V_{rad}$, the effect of the illumination can be determined.

An example of the composite output signal from the array 5 is illustrated in FIG. 2C. The first section of FIG. 2C illustrates the output signal in response to the illumination of pixels in the original image having a relatively high density. It will be seen in this case that the radiation voltage signal $V_{rad}$ is relatively close to the reference level whereas the second section of FIG. 2C illustrates the output signal in a low density region where it will be seen that the sensor output signal $V_{rad}$ is much larger. The problem arises in the high density regions since conventional analogue circuit components cause the signals $V_{ref}$ and $V_{rad}$ to become noisy to such a degree that the noise causes changes in levels of the signals by amounts comparable with the difference between the true values of the signals.

To deal with this, the output signals from the array 5 are fed to each of the switches 10, 11 in parallel. The activation of the switches 10, 11 is controlled by timing signals from the switch controller 20 which are applied respectively to the switches 10, 11. These timing signals are shown in FIGS. 2A and 2B respectively, the timing signal of FIG. 2A being applied to the switch 10 and that of FIG. 2B being applied to the switch 11. When the timing signal has a high value, the corresponding switch is activated to connect the input to the respective ouput whereas in the other state, the swithc is deactivated to the state shown in FIG. 1. Thus, it will be seen by comparing FIGS. 2A and 2B with FIG. 2C that within each sampling period $T_s$ the switches 10, 11 are activated generally in turn but with some overlap thus feeding initially the $V_{ref}$ signal to the filter 12 and subsequently the corresponding video or $V_{rad}$ signal to the filter 13. The filters 12, 13 remove high frequency components due to noise and the like, and due to their relatively slow operation relative to the sampling rate average the incoming signals due to a small number of pixels. The resultant filtered and averaged signals are fed to the instrumentation amplifier 18.

Typically, each of the $Vref_{ON}$ and $Video_{ON}$ periods have a duration of about 600 ns while $T_s$ is about 2 µs, and the array will have between 2500 and 5000 pixels. The ON times correspond to samples of a few (eg. 10) pixels which are averaged.

It will be seen that in the FIG. 1 configuration, the input signal is filtered and averaged at the same time as being separated but before being subtracted. Thus, very high frequency response amplifiers are not needed. The configuration is balanced in both channels and is designed such that monolithic (or non-monolithic) matched devices can be used. The gain in both halves is largely unaffected by component values.

A more complex implementation is shown in FIG. 3 in which the flat bed arrangement of FIG. 1 has been omitted for clarity. In this example, the output signals from the sensor 6 are fed to a monolithic, analogue switch 21 which may be of the same type as the previous example. The switch 21 includes four switches SW1-SW4 to each of which the input signal is fed in parallel. The ouputs of switches SW1-SW4 are fed to respective resistors 22A-22D and the output of switch SW4 constituting the dark reference signal. The switches SW1-SW3 are connected to a capacitor 23A and the switch SW4 is connected to a capacitor 23B. Output signals from the filters defined by these resistors and capacitors are fed to an instrumentation amplifier 25 similar to the amplifier 18, the output of the amplifier being fed to a switch SW6 of a monolithic, analogue switch 26.

The output signal from the sensor 6 is also fed via a wire 27 to the inverting input of a fast operational amplifier 28. The non-inverting input of the amplifier 28 is coupled via a buffer amplifier 29 to the dark signal filter defined by resistor 22D and capacitor 23B.

The output signal form the operational amplifier 28 which represents the difference between the two input signals is fed to a swithc SW5 of the analogue switch 26.

The positions of the switches SW1-SW6 are controlled by respective control lines from a switch controller 30 which is responsive to an input signal from an intensity level monitor 31.

FIG. 4 illustrates how the sensor output voltage varies with density on an arbitary linear scale and also indicates the ranges of density within which each switch is actuated.

In operation, the intensity level monitor 31 monitors the general level of radiation impinging on the sensor assembly 5 in a conventional manner in order to sense the density level and generates an corresponding two state ouput signal.

If the density level is in the range 0 to 1, the pixels are not averaged and the switch controller 30 responds by activating swithc SW5 to couple the high speed amplifer 28 to the output of the switch 26. The switch SW6 remains deactivated. As a result the radiation value for each pixel is modified by the corresponding reference or dark level signal for that pixel without averaging since the magnitude of the signals is such that noise does not cause a problem. The signal output by the amplifier 28 will alternate between a corrected signal and a signal without meaning. To deal with this the switch SW5 can be regularly opened and closed to pass only the corrected signal or the switch SW5 can be permanently closed and apparatus downstream of the switch eg. digitising apparatus can be arranged to act on only the corrected portions of the signal.

If the level monitor 31 senses a density in the range 1 to 2 averaging is required and switches SW1 and SW6 are activated so that a filter is formed by resistor 22A and capacitor 23A. The time constant of the filter would be set at ½ to 1 pixel $VIDEO_{ON}$ time (300–600 ns) and it would thus average 1 to 3 pixels.

In the density range 2 to 3, the video signal filter would be formed by resistor 22B and capacitor 23A by activating switch SW2 (and SW6). The time constant would be set at 2 to 4 times the pixel valid time ($VIDEO_{ON}$) and it would average 4 to 12 pixels.

In the density range 3 to 4, the video signal filter would be formed by resistor 22C and capacitor 23A by activating swithc SW3 (and SW6). The time constant would be set at 2 to 4 times the pixel valid time ($VIDEO_{ON}$) and it would average 16 to 48 pixels.

In each case the switches SW1–SW3 respectively and the swithc SW4 are actuated in a manner similar to the switches 10, 11 of the FIG. 1 example.

As an alternative to switches SW1–SW3, a continuous voltage controlled resistor could be used. While, instead of switches SW5, SW6 separate digitisation systems could be used and the signals selected digitally.

I claim:

1. A method of processing output signals from a radiation sensing assembly which generates, for each of a succession of sampling periods, output signals representing respectively a reference level and a radiation level related to the radiation incident on a sensor of said assembly during each respective sampling period, the method comprising performing in real time the steps of filtering a plurality of successive reference level signals and the corresponding plurality of successive radiation signals associated with said plurality of reference level signals to minimise high frequency noise effects on the signals so as to generate filtered and averaged reference level and radiation level signals; and generating a signal related to the difference between said filtered reference level and filtered radiation level signals.

2. A method according to claim 1, wherein said reference level signal is generated when no radiation is incident on said radiation sensor.

3. A method according to claim 1, wherein said reference level and radiation level output signals are generated in an interleaved manner.

4. A method according to claim 1, wherein said radiation is generated when light is incident on said sensor.

5. A signal processing circuit for processing in real time output signals from a radiation sensing assembly having a plurality of radiation sensors and which generates, for each of a succession of sampling periods, output signals representing respectively a reference level and a radiation level related to the radiation incident on each said sensor of said assembly during each respective sampling period, the circuit comprising a low pass filter for receiving said output signals and for filtering a plurality of reference level signals and a corresponding plurality of radiation level signals associated with said plurality of reference level signals to minimise high frequency noise effects on the signals and to generate filtered and averaged reference level and radiation level signals; and a difference circuit for generating a signal related to the difference between said filtered reference level and filtered radiation level signals.

6. A circuit according to claim 5, further comprising means for generating timing signals; and a switch to which the output signals are fed, said low pass filter comprising a pair of filters coupled in parallel to said switch whereby said timing means controls said switch to pass said reference level and radiation level signals to respective ones of said pair of filters.

7. A circuit according to claim 5, wherein said difference circuit comprises an instrumentation amplifier.

8. A method of scanning an image, the method comprising irradiating a physical embodiment to which said image corresponds, causing radiation from said image to impinge on a radiation sensing assembly having a plurality of radiation sensors and which generates, for each of a succession of sampling periods output signals representing respectively a reference level and a radiation level related to the radiation incident on each sensor of said assembly during each sampling period, causing relative scanning movement between said image and said sensing assembly, monitoring the general level of radiation impinging on the radiation sensing assembly and (i) if said general level is less than a predetermined threshold, carrying out a method comprising performing in real time the steps of filtering a plurality of successive reference level signals and the corresponding plurality of successive radiation signals associated with said plurality of reference level signals to minimise high frequency noise effects on the signals so as to generate filtered and averaged reference level and radiatioin level signals; and generating a signal related to the difference between said filtered reference level and filtered radiation level signals, and otherwise (ii) determining the difference between the reference and radiation levels corresponding to each sensor of said assembly.

9. A method according to claim 8, wherein step (i) is performed if radiation is sensed from a black portion of said image.

10. Image scanning apparatus comprising a source of radiation, a radiation sensing assembly having a number of radiation sensors and which generates, for each of a succession of sampling periods, output signals representing respectively a reference level and a radiation level related to the radiation incident on each sensor of said assembly during each sampling period, the radiation having impinged on said image; means for causing relative scanning movement between an image and said sensing assembly; means for monitoring the general level of radiation impinging on said radiation sensing assembly; a signal processing circuit comprising a low pass filter for receiving said output signals and for filtering a plurality of reference level signals and a corresponding plurality of radiation level signals associated with said plurality of reference level signals to minimise high frequency noise effects on the signals and to generate filtered and averaged reference level and radiation level signals; and a difference circuit for generating a signal related to the difference between said filtered reference level and filtered radiation level signals; an auxiliary signal processing circuit; and switch means, said switch means being presponsive to said monitoring means such that if the general level of radiation impinging on said radiation sensing means is less than the threshold, said switch means causes output signals from said radiation sensing assembly to be processed by said signal processing circuit and otherwise causes the output signals to be processed by said auxiliary signal processing circuit which determines the difference between reference and radiation levels corresponding to each sensor.

11. Apparatus according to claim 10, wherein said radiation sensing assembly comprises a number of said radiation sensors arranged in a line.

* * * * *